United States Patent [19]

Parks et al.

[11] Patent Number: 4,717,807
[45] Date of Patent: Jan. 5, 1988

[54] METHOD AND DEVICE FOR CONTROLLING A SHORT CIRCUITING TYPE WELDING SYSTEM

[75] Inventors: John M. Parks, Solon; Elliott K. Stava, Brecksville, both of Ohio

[73] Assignee: The Lincoln Electric Company, Cleveland, Ohio

[21] Appl. No.: 940,580

[22] Filed: Dec. 11, 1986

[51] Int. Cl.⁴ .............................................. B23K 9/09
[52] U.S. Cl. ......................... 219/130.21; 219/137 PS
[58] Field of Search ..................... 219/130.21, 137 PS

[56] References Cited

U.S. PATENT DOCUMENTS

| | | | |
|---|---|---|---|
| 3,792,225 | 2/1974 | Needham et al. | 219/130.21 |
| 3,809,853 | 5/1974 | Manz | 219/130.21 |
| 4,544,826 | 10/1985 | Nakanishi et al. | 219/137 PS |
| 4,546,234 | 10/1985 | Ogasawara et al. | 219/137 PS |

OTHER PUBLICATIONS

P. Budai et al., "A Power Source for Advanced Systems", 1st International Conf. on Advanced Welding Systems,. 11/1985.
T. Ogasawara et al., "A Power Source for Gas Shielded Arc Welding with New Current Wave Forms", 1st Int. Conf. on Advanced Welding Systems, 11/1985.
Publication entitled *Control of Short Cirtuiting in MIG—Welding,* published in Welding Research International, 1974 Edition.

*Primary Examiner*—Clifford C. Shaw
*Attorney, Agent, or Firm*—Body, Vickers & Daniels

[57] ABSTRACT

A method and device for controlling a power supply for arc welding in a manner to reduce spatter when the power supply is employed for depositing metal from a welding wire or electrode onto a workpiece by the short circuiting transfer mode wherein a welding current causes the welding wire to alternate between a short circuit condition and an arc condition with metal transfer occurring during a short circuit condition. This method and device includes the concept of shifting the welding current to a background current value in response to a short circuit condition, holding the welding current generally at the background current level for a preselected time, then allowing the welding current to reach the normal unimpeded current level, and causing the holding step to be terminated before the selected time in response to a detected arc condition. This concept provides a predetermined low current condition immediately upon establishing a short circuit between the welding wire or electrode and the workpiece, which low current condition is retained long enough to convert what otherwise would be a spatter-laden momentary short circuit to a short circuit where metal is transferred to the workpiece. Further, the method and device detects the slope of the welding current or voltage and shifts the welding current to the low background current level when the welding current reaches its maximum value just before breakage of the metal from the wire thus reducing the spatter energy when the molten metal breaks from the wire.

29 Claims, 20 Drawing Figures

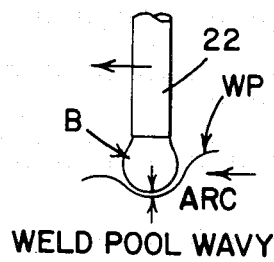
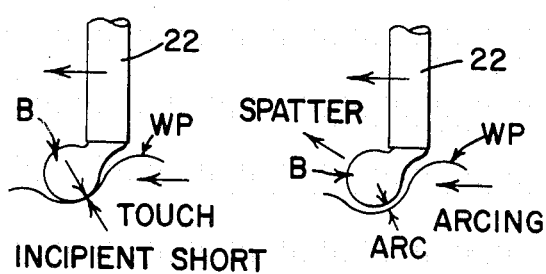
WELD POOL WAVY
FIG. 6A
TOUCH
INCIPIENT SHORT
FIG. 6B
SPATTER
ARCING
FIG. 6C
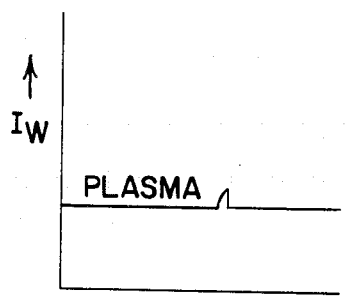
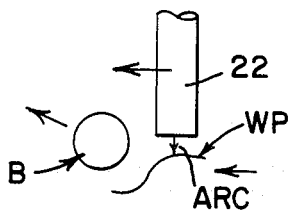
FIG. 6D
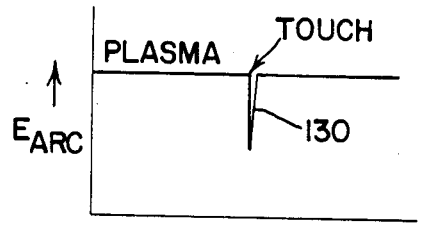
FIG. 7

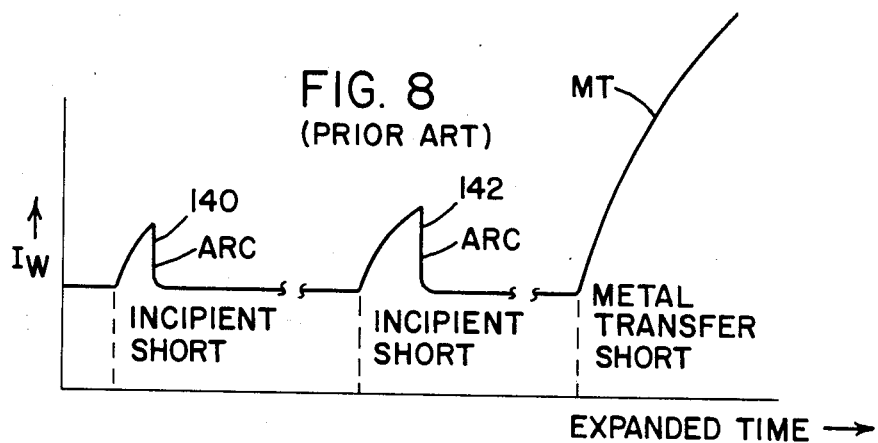
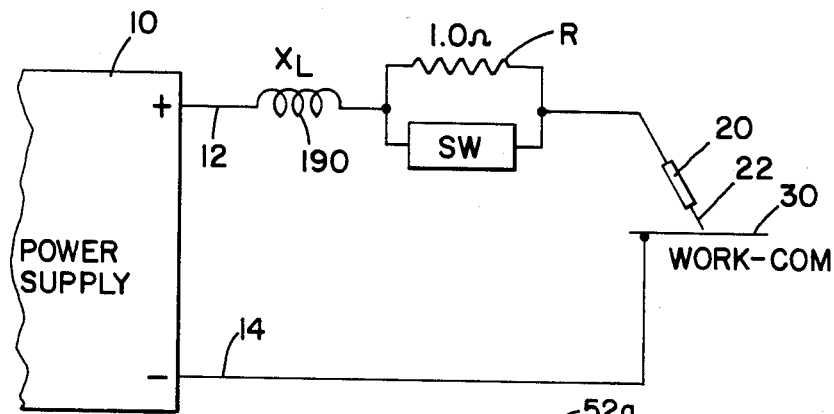
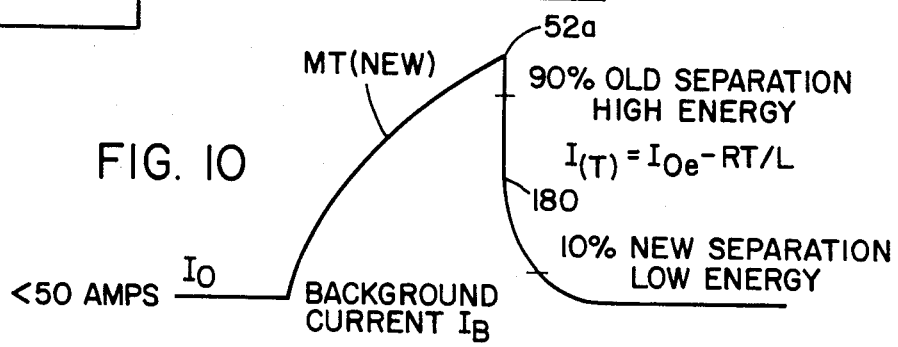

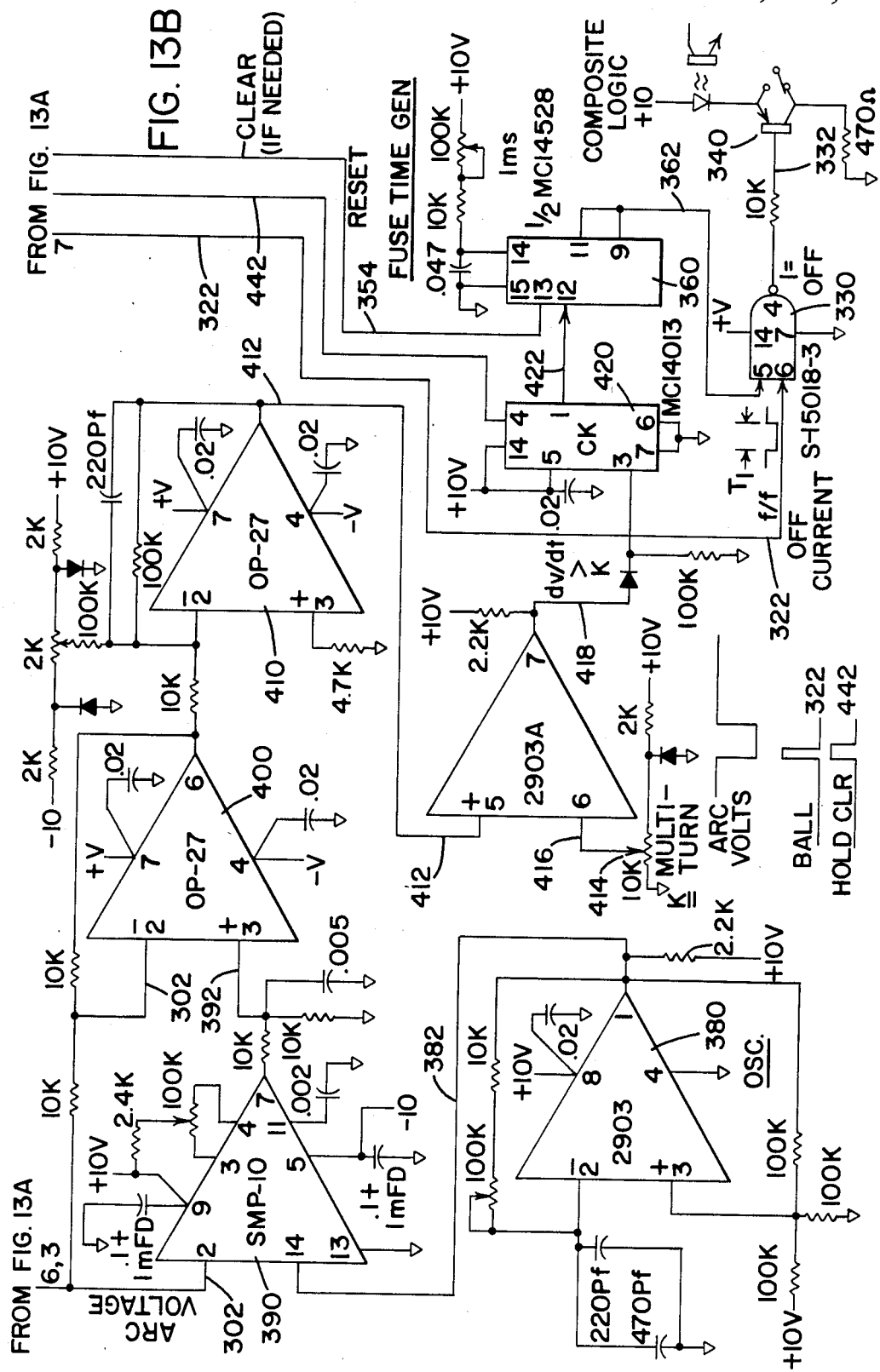

METHOD AND DEVICE FOR CONTROLLING A SHORT CIRCUITING TYPE WELDING SYSTEM

The invention relates to the art of welding with an electric arc and more particularly to an improved method and device for controlling a short circuiting type welding system to drastically reduce spatter which normally accompanies this type of welding process.

BACKGROUND OF INVENTION

In consumable electrode arc welding, one of the recognized modes of operation is the short circuiting mode, wherein a power supply is connected across the consumable electrode, or welding wire, and the workpiece onto which a weld bead is to be deposited. As an arc is created, the end of the electrode melts to form a globular mass of molten metal hanging on the electrode and extending toward the workpiece. When this mass of molten material becomes large enough, it bridges the gap between the electrode and the workpiece to cause a short circuit. At that time, the voltage between the electrode and the workpiece drops drastically thereby causing the power supply to drastically increase the current through the short circuit. Such high current flow is sustained and is actually increased with time through the molten mass as the power supply inductance is overcome. Since this short circuit current continues to flow, an electric pinch necks down a portion of the molten mass adjacent the end of the welding wire. The force causing the molten welding wire to neck down is proportional to the square of the current flowing through the molten metal at the end of the welding wire. This electric pinch effect is explained by the Northrup equation:

$$G(dynes/cm^2) = \frac{I^2(R^2 - r^2)}{100\pi R^4}$$

I is current density, r is the distance from the center of the welding wire and R is the diameter of the neck. During the short circuit, there is a need for a relatively high current flow, which flow naturally results when the short circuit occurs. This high current flow is desirable to cause the neck portion of the molten mass to form rapidly into a very small area or neck which ultimately explodes like an electric fuse to separate the molten ball from the wire and allow it to be drawn into the weld pool by surface tension. This explosion of the neck causes spatter from the welding process. Spatter is deleterious to the overall efficiency of the welding operation and requires a substantial amount of cleaning adjacent the weld bead after the welding operation is concluded. Since the current flow through the wire or rod to the workpiece when the neck or fuse explodes is quite high, there is a tremendous amount of energy released by the neck explosion adding to the propelled distance and amount of spatter.

As can be seen, there is contradiction between the short circuit current which should be high to efficiently decrease the neck size by an electric pinch, but should be low to reduce the energy of the fuse explosion and, correspondingly, reduce the spatter and distance over which the spatter particles will be propelled.

A considerable amount of effort has been devoted to limiting spatter when the arc is reestablished by the explosion at the neck or fuse of the metal ball hanging from the welding wire and engaging the workpiece or weld pool. At first, it was suggested to reduce the diameter of the welding wire, i.e. use a 1/32 wire; however, this approach to reducing spatter caused all of the inefficiencies normally associated with using small welding wire. For instance, it was difficult to lay large amounts of weld bead and the wire sometimes stubbed or entered the weld pool without melting. As the wire diameter increased to overcome these problems, spatter was substantially increased. Faced with this dilemma, it was suggested that a high frequency power supply be used as taught in U.S. Pat. No. 4,544,826, incorporated by reference herein, wherein a high frequency inverter is turned off during a short circuiting condition or upon detection of a premonition of rearcing, i.e. blowing of the fuse. To prevent circulating currents when a high frequency power supply is turned off just before a fuse explosion, this United States Letters Patent illustrates a switch, SWD, which is opened to place a resistor in the output tank circuit of the solid state inverter for rapid attenuation of the circulating currents. This system is not applicable for all power supplies and is predicated upon a complex logic control system which actually forms the shape of the current curve from the time a short is detected to the time when the arc is reestablished after explosion of the neck or fuse. Reduction of current at the time of a short is by tuned attenuation, which phenomenon causes a time constant curve between time $t_1$ and $t_2$. At the detection of a neck or fuse which is about to blow, this same attenuation concept is employed. This feature is shown between the times $t_5$ and $t_6$ of this prior patent. The preselected wave shape, as shown in this patent, is heavily reliant upon the aforementioned attenuation of the output tank circuit of a solid state inverter which is a serious limitation especially in reducing the current flow through the neck itself at the moment of explosion. Such a preselected current shaping is applicable, if at all, to a high frequency solid state inverter power supply which can be internally turned off without substantial output inductance. With a substantial inductive reactance in the output circuit attenuation by the resistor in parallel with switch SWD would be difficult and not always guaranteed. Since direct current welding systems have output inductance this attenuation concept for lowering spatter has serious practical drawbacks.

Another patent showing a system for creating a repetition of a current cycle originally triggered by a short circuit detection is U.S. Pat. No. 4,546,234. Again, the current wave form is somewhat fixed. After a preselected time delay, current is applied across the shorted molten metal globular or ball to facilitate metal transfer. A constant current is maintained until necking is predicted, at which time the current drops rapidly to a low level and then immediately shifts up to a second high level. This system causes preselected current wave forms which are complex and generally usable, if at all, only with a high frequency solid state inverter type power supply.

As can be seen, there is a definite need for a relatively simplified system for reducing weld spatter by exerting a limited amount of actual control over weld current flow so that the current flow can assume natural operating characteristics over most of the cycle between the short and the fuse explosion. In addition, there is a substantial demand for a spatter reducing circuitry to be used with both transformer fed and solid state inverter type power supplies which do not depend upon output attenuation of low inductance circuits nor upon several distinct current level limitations.

THE PRESENT INVENTION

The present invention overcomes the disadvantages of prior attempts to reduce spatter in a welding system of the type employing the short circuit, transfer mode which system requires a minimum of logic circuits and is applicable for a wide variety of power supplies with and without a substantial amount of inductance in the output circuit.

In accordance with the broadest aspect of the present invention, a main weld current is on whenever the arc voltage exceeds a preselected threshold level, such as 10 volts. When the arc voltage drops below this preselected value, the main welding current is turned off for a selected time and is then turned on again. During this period or cycle a low background current is maintained so the molten metal mass or ball hanging from the welding wire and in contact with the workpiece either breaks away or develops into a metal transfer short under the influence of only the low background current and not the main current. Consequently, any molten metal ball which does not actually transfer to the weld bead or weld pool on the workpiece will be subject to only low background current when it separates from the weld pool. Such low current does not tend to propel the ball or portions thereof from the wire away from the weld pool. These bulbs or balls of molten metal may only momentarily engage the molten weld pool or weld bead thus causing a phenomenon referred to as an "incipient short". An incipient short is not a metal transfer short, but is the engagement of the ball with the weld pool succeeded by a bouncing away of the ball from the molten pool by electric pinch forces to again establish an arc without any metal transfer. The momentary short would occur well within the selected time of low current. In practice, this time is 1.0 ms. As incipient shorts are created, the main weld current is turned off reducing pinch forces at the contact point between the molten metal ball and the weld pool. By maintaining the welding action with a low level current flow there is sufficient current to maintain the melting action but generally insufficient current to create high level pinch forces tending to re-establish the arc and allow arc jet forces to propel the molten ball from the weld pool. Consequently, the short converts into a metal transfer short and progresses without forming an incipient short. The term "workpiece" is used herein to indicate either the metal onto which the weld bead is being laid or deposited, the bead itself or the weld pool. All of these are electrically grounded to the power supply.

If the short circuit is only a momentary short associated with an incipient short condition, the main current will come on when the short is broken and the arc reestablished. If the incipient short condition is converted to a transfer short during the time of forced low current, which is the general result, a short condition remains after the initial preselected time of low current. The arc voltage remains at a low level, but the main current is turned on. When this occurs, the current through the molten bath between the welding wire and the workpiece increases rapidly because of the continuing short circuit between the welding wire and the workpiece. As main current continues to flow through the welding wire, the wire continues to heat and its resistivity increases. The ball bridging the gap starts to neck down by the electric pinch effect at a rate proportional to the square of the weld current. As the resistivity increases and as the neck decreases in diameter, the voltage commences to increase. Since the necking action is generally self-sustaining after it starts, commencement of the neck signals an impending fuse blow preceded by an increased voltage and a change in sign of the current slope. A time derivative of the operating voltage or of the weld current with the main current applied across the shorted metal indicates when the metal is electrically pinched by the main current flow. A rapid rise in the voltage or change of slope of the weld current indicates an imminent blow of the fuse or neck. When an imminent fuse explosion is indicated by the voltage or current derivative, the main current is again immediately turned off, just before the loss of metal contact. With the main current off, the low background current causes the fuse explosion at the neck. This is a low energy explosion without sacrificing efficient separation. During separation of the bridging metal, the plasma or arc is restored by the background current and the arc voltage increases. When the arc voltage exceeds the control value, the main current is again turned on awaiting the next short.

To prevent interruption of the main current immediately after a short is detected, the circuit measuring the time derivative of the voltage or current is deactivated for a short time immediately following the first time delay after a short circuit detection. This deactivation prevents a derivative measurement or detection when the main current is turned on after the time delay. If this derivative detection feature were to function immediately after the delay, the main current would again be turned off thereby preventing the formation of a high shorting current and development of a strong electric pinch. During this transition to the main current there are variations in the voltage which could be erroneously identified as a necking condition by the circuit measuring the time derivative of the arc voltage or time derivative of the weld current.

The invention as defined above allows the main current to switch off so that a low level background current is maintained for a preselected maximum time immediately after a short circuit detection. Upon detection of an imminent fuse breakage at the end of a metal transfer cycle the same low level background current is applied for a selected time delay. During these time delays, should the voltage increase above the selected value, thus indicating an arc condition, the main current is immediately applied and the welding process continues as if there were no control over the weld current.

Actual metal transfer in a short circuiting mode of operation follows a short circuit condition caused by the molten ball touching the weld pool. After the short circuit, the flow of current drastically increases through the shorted ball until the current flow causes a necking of the molten metal ball at the end of the weld wire. When that happens, the resistance through the molten metal ball increases causing a corresponding decrease in the applied main current. Immediately thereafter, since the main current is still flowing, the neck size decreases until it explodes. By employing the present invention, the current actually flowing through the neck or fuse when it explodes is reduced to a level drastically below the normal current level experienced by using the main welding current during actual fuse explosion. A reduction in current flow at the time of rupture drastically reduces spatter by decreasing the energy of the fuse explosion. By using a derivative of voltage or current, the neck can be accurately detected so the current can be reduced before the fuse blows.

In accordance with the present invention, the first time delay is interrupted and the main current is immediately applied whenever an arc is reestablished after a short. This occurs during an incipient short. The main current then increases to the plasma level awaiting an actual transfer short. Consequently, the metal ball at the end or the welding wire is not subjected to high propelling forces. The molten balls do not tend to grow by repeated momentary shorts separated by arc jets. In this manner, the present invention recognizes and overcomes the problems caused by incipient shorts by allowing actual metal transfer to the weld pool during normal transfer shorts, but also providing only a low current condition during the formation of incipient shorts. Thus, high current flow does not cause drastic high activity breaking the molten ball from the weld pool as occurring in a system with no reduction in current at the start of a short. However, the present invention overrides the low or background current control feature whenever there is an arc, immediately following a short circuit condition, such as would occur with an incipient short, if one should appear. By using the invention, incipient shorts are generally avoided. Further, the weld current is not forced through a preselected combination of current levels based purely on time cycles, as sometimes employed in the prior art for reason other than control of incipient shorting.

In summary, the concept of incipient shorting as a mechanical component of spatter and utilizing the present invention to eliminate nearly all incipient shorts is a substantial improvement in spatter control. In accordance with the invention, every short is assumed to be an incipient short and the welding current is reduced to a background level so the agitation of the weld pool and the forces of the arc are minimized. This greatly increases the probability that even an incipient contact between the molten ball and the molten weld pool will be converted into a normal, desirable transfer short by attraction of the weld pool surface. Should the incipient contact or short be one which is abnormally violent and cannot, or does not, convert into a transfer short, the fact that the ball contacts and separates from the weld pool at the low background current level all but eliminates spatter normally generated by this nontransfer action referred to herein as an incipient short.

By recognizing and correcting the disadvantages of the incipient shorts and by also correcting the problems of high energy fuse explosion with only a shift between main current and background current, the problem of weld spatter has been essentially eliminated.

By utilizing the concept of the present invention, spatter can be reduced drastically over normal short circuiting type welding without the complexity and current wave shaping of other spatter reduction techniques.

Use of the present invention reduces the violent oscillations of the molten weld pool which further reduces tendency of spatter. Further, a more quiescent weld pool allows the surface tension to better bridge the root gap between two pieces being welded. Also, the pool will better conform to the pieces being welded with the reduced agitation caused by high energy fuse explosions and incipient shorts. The weld pool, when less agitated, allows use of larger electrodes in out of position welding. Short arc lengths can be maintained without stubbing. Consequently, the invention allows use of larger electrodes, high deposition rates, high currents and, also, less contamination by entrapment of shielding gases.

The primary object of the present invention is the provision of a method and device for controlling current between a main welding current and a background welding current in a manner to drastically reduce spatter in a short circuiting type of welding system.

Another object of the present invention is the provision of a method and device as defined above, which method and device does not control the welding current in a series of preselected levels having imprecise correlation with the actual demand for reduced spatter.

Another object of the present invention is the provision of a method and device, as defined above, which method and device prevents incipient shorts from causing large particle spraying from the welding operation.

Yet another object of the present invention is the provision of a method and device, as defined above, which method and device allows use of a large range of wire diameters. Consequently, larger welding wire can be used without deleterious spatter. The terms "wire" and "electrode" are used somewhat interchangeably to mean the elongated consumable metal element feed into the welding area to be transferred during the welding process. The invention may be used with manual stick electrodes.

Another object of the present invention is the provision of a method and device, as defined above, which method and device can be used on power supplies of the inverter type, motor generator sets, and conventional transformer type. In the past, spatter control systems were primarily limited to high frequency solid state inverters because these power supplies exhibited substantially reduced inductive reactance in the output circuit. The spatter control systems of the past required low output inductive reactance.

Still a further object of the present invention is the provision of a method and device, as defined above, which method and device employs a Darlington power transistor. This type of transistor has a rapid turn-off time and a high voltage and current rating.

Still a further object of the present invention is the provision of a method and device which allows high current during the transfer short to initiate formation of a neck between the rod and the ball of material being transferred and then, abrputly, reduces the current just before the neck acts as a fuse and explodes. This reduced current at the time of "blow" or explosion produces a low energy during the actual restriking of the arc by rupture of the neck. The high short circuit current at the initial stage of forming the neck causes a substantial electric pinch. This advantage is confirmed by the known electrical principle that the electric pinch is a factor of the square of the current flowing through the molten metal ball between the welding wire and the workpiece. Should current be turned off or reduced before the neck is well formed and nearing explosion, the desired necking phenomenon would be adversely affected. The neck is started with a high current and then the squeezing action at the neck continues with the low current applied directly a mere instant before the fuse ruptures.

Yet another object of the present invention is the provision of a method and device for reducing spatter in a short circuiting type of welding operation which can function with a variety of shielding gases and with different electrode types and sizes.

Yet another object of the present invention is the provision of a spatter reduction system which reduces both neck exposing spatter at the end of a metal transfer pulse and also incipient short spatter at the start of the transfer pulse.

These and other objects and advantages will become apparent from the following description taken together with the accompanying drawings described below.

BRIEF DESCRIPTION OF DRAWINGS

FIGS. 6A, 6B, 6C and 6D are schematic views illustrating an "incipient short", as this term is employed in the present application and certain physical and electrical characteristics of this surprising phenomenon;

FIG. 7 is a graph showing welding current exhibiting certain electrical characteristics associated with the incipient shorts phenomenon, shown schematically in FIGS. 6A–6D;

FIG. 8 is a current curve showing two unwanted incipient shorts followed by a desired metal transfer short with the time abscissa expanded and interrupted and the current ordinate somewhat exagerated;

FIG. 9 is a schematic diagram of the preferred embodiment of the present invention used in explaining a characteristic of the present invention illustrated in FIG. 10;

FIG. 10 is a graph showing a welding current wave form using one feature of the invention for reducing current at the neck;

PREFERRED EMBODIMENT OF THE INVENTION

Figure 1:
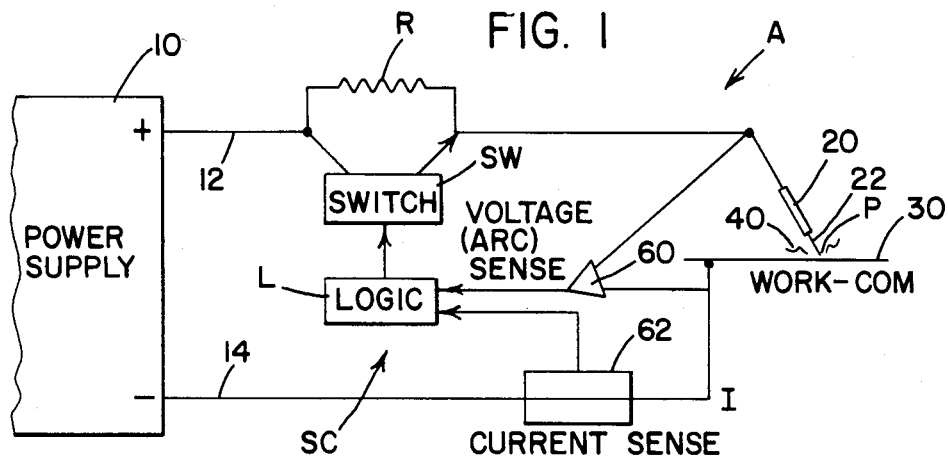
FIG. 1 is a schematic diagram of a short circuiting type welding system employing the preferred embodiment of the present invention.

Referring now to the drawing wherein the showings are for the purpose of illustrating the preferred embodiment and not for limiting same, FIG. 1 illustrates a welding system A constructed in accordance with the present invention. System A contains a spatter reduction or control circuit SC which will be desired later. Since spatter control circuit SC is capable of addition to a standard short circuit type welding unit, system A of FIG. 1 illustrates components common to a welding operation whether or not inventive circuit SC is used. FIG. 1 will initially be employed to explain general background and concepts used in short circuit type welding. The commonly used components of system A include a conventional transformer type power supply 10 having a constant voltage output with inductive reactance internal to the power supply that prevents rapid discontinuation of welding current using normal solid state switching procedures. Output leads 12, 14 are connected in series across gas nozzle 20, welding wire 22 and workpiece 30. These components are arranged in a series circuit schematically illustrated in FIG. 1; however, a mechanism for feeding the wire 22 toward the weld pool on workpiece 10 for the purpose of laying a bead along the workpiece would be an integral component of system A. Such normal wire feeding mechanism does not form a part of the present invention. The present invention can be used in a standard short circuiting mode of welding as so far explained with the aid of standard components illustrated in system A of FIG. 1. This system employs a conventional transformer type power supply applying an arc voltage across wire 22 and arc or plasma P. Such voltage causes a weld current to flow from wire 22 to workpiece 30. In accordance with general practice an appropriate shielding gas 40 is directed from nozzle 20 around wire 22 to reduce oxidation and contamination of the metal being deposited in the weld pool on the workpiece 30. Of course, either workpiece 30 or welding head including nozzle 20 is moved along a desired path to deposit a linear welding bead either on the surface of the workpiece or in a groove formed between two abutting workpieces.

Figure 2A:
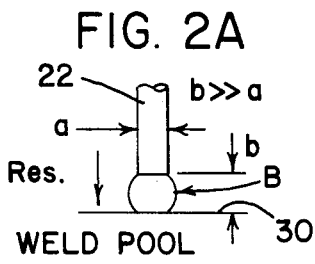
FIGS. 2A, 2B and 2C are schematic views illustrating progression of the molten metal bath formed on the end of the welding wire during the short circuit condition and at the fuse break.
Figure 2B:
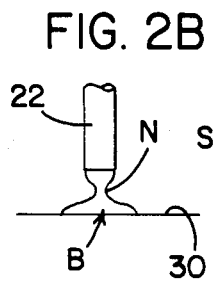
Figure 2C:
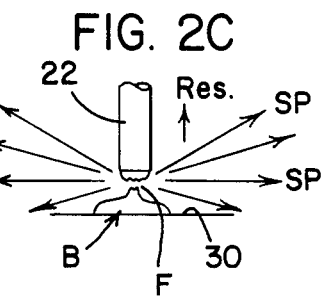

In a standard short circuiting transfer mode of welding as so far discussed, the metal is deposited from the wire onto the workpiece by passage of a welding current through the wire and to the workpiece which alternates between a short circuit condition wherein the rod or wire touches the workpiece and an arc condition or plasma condition, wherein there is a gap between the wire and workpiece. This gap below the wire is spanned by an arc or plasma. The term "workpiece" refers to the weld pool already deposited on the surface being treated or the workpiece itself, which definition is used herein for convenience. FIGS. 2A, 2B and 2C, schematically illustrate the short circuiting transfer phenomenon for transferring metal melted at the end of wire 22 and deposited on the workpiece by the surface tension drawing the metal into the weld pool of molten metal containing the previously deposited metal. This weld pool is dynamic in nature and retains its fluidity for a substantial time after nozzle 20 progressively moves along the workpiece. As is well known, the bottom of wire 22 is maintained spaced from the workpiece or molten weld pool previously deposited a distance b which is substantially greater than the diameter a of the wire. In practice, diameter a can vary substantially and still be used in a welding system using the present invention. In the past, small wire diameters, typically, 0.035 inches were used to reduce spatter since such small wire was cradled in the weld pool and spatter, if any, was physically caught in the weld pool formed around the end of the wire as it deposits metal into the weld pool. Since spacing b is greater than diameter a, a molten metal bulb or ball B, shown in FIG. 2A, has a geometric spherical shape somewhat greater than a hemisphere. This ball shape facilitates separation and surface tension transfer from rod 22 to the molten weld pool or work piece 30. In summary, in the standard short circuit mode of welding, current passes through wire 22, and an arc is caused between the bottom of the wire and the weld pool or workpiece 30, whereby the heat of the arc or plasma causes the end of wire 22 to become molten. This molten material grows in size until it bridges the gap indicated as spacing b by forming ball B and causes a short circuit. Since the circuit resistance drops drastically when this short circuit occurs the weld current immediately increases and the voltage immediately drops. The rapid current rise is shown at the left side of the metal transfer pulse MT, illustrated in FIG. 3 wherein the welding current over a normal short circuit metal transfer is schematically illustrated. Welding current $I_W$ has a normal arc or plasma current level $I_P$ which is a minimum current level and is controlled primarily by the output resistance. Between arc or plasma periods when plasma current $I_P$ is flowing, there is a metal transfer short pulse MT where welding current $I_W$ is increased and then decreased back to plasma current $I_P$. Pulse MT, which is standard when a transfer short occurs, includes a leading, rapidly rising curved side 50, which increases to a maximum from the point S. A short condition is illustrated in FIG. 2A. As the current increases, ball B clings by surface tension to the molten weld pool and forms a distinct neck N in accordance with the electric pinch effect. The diameter of the neck N is reduced by current induced forces in accordance with the Northrup equation. This causes the resistance through ball B to increase. Consequently, when the neck starts, the welding current $I_W$ curve in FIG. 3 reverses direction and starts downward due to the increasing resistance as the diameter of neck N decreases rapidly. Since the necking force or electric pinch effect varies as the square of the welding current, substantial forces are being exerted at the top of ball B to cause a rapid necking down. For that reason, as soon as the neck starts as shown generally in FIG. 2B, the neck diameter decreases rapidly at an accelerated rate. This results in a fuse action or neck explosion F, represented schematically in FIG. 2C. This explosion at point 54 in FIG. 3 immediately restrikes a plasma or arc between wire 22 and workpiece 30 so that the current $I^W$ first drops rapidly along portion 55 of pulse MT and then gradually along line 56 as the arc stabilizes. At top 52 of metal transfer short pulse MT the current derivative di/dt is reversed and becomes negative. As soon as the neck is formed, it immediately breaks as illustrated by steep line 57 between top 52 and explosion point 54. Time constant portion 56 of metal transfer pulse MT follows the initial rapid current drop along line 55 immediately after the explosion at point 54. As can be seen, the neck starts forming and is immediately blown away in short time TN in FIG. 3, which is drawn to scale.

Figure 3:
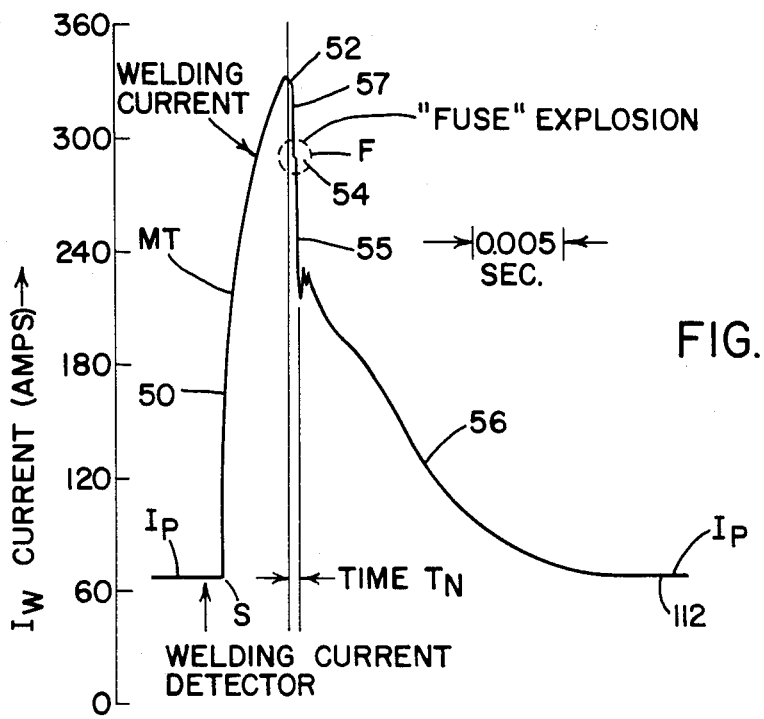
FIG. 3 is a graph of the welding current during a somewhat standard metal transfer, as shown in FIGS. 2A, 2B and 2C.

In summary, ball B forms on the end of wire 22 and enlarges until it makes contact with the weld pool or workpiece 30 shown in FIG. 2A. Surface tension then draws ball B from the end of rod 22 preparatory to the electric pinch effect causing ball B to neck down as shown at N in FIG. 2B. Immediately thereafter, the fuse breaks or blows, as shown in FIG. 2C. As shown in FIG. 3, at the fuse F, the current is nearly 300 amperes; therefore, tremendous energy is released when ball B separates from wire 22. This causes spatter of molten metal, indicated as arrows SP in FIG. 2C. This spatter flies outwardly with a high momentum carrying spattered metal some distance away from the actual welding operation. To reduce spatter SP in the past, wire 22 was reduced in size so as to bury the arc in the weld pool, thus, permitting the weld pool to catch most of the spatter particles of molten metal and reduce the tendency to drive the spatter particles away from the weld pool. Also, complex circuits were suggested to control the shape of metal transfer pulse MT during the metal transfer cycle. These prior arrangements tended to drive pulse MT in a preselected pulse shape. Often the pulses were repeated, irrespective of whether they were needed or not or whether the metal transfer actually occurred. The present invention overcomes these disadvantages by making only minor modifications in the conventional system so far discussed with respect to certain components of system A in FIG. 1. The normal welding current curve, as shown in FIG. 3, is controlled by simple, easily accomplished structural modifications of the normal short circuit system so far described.

Figure 4:
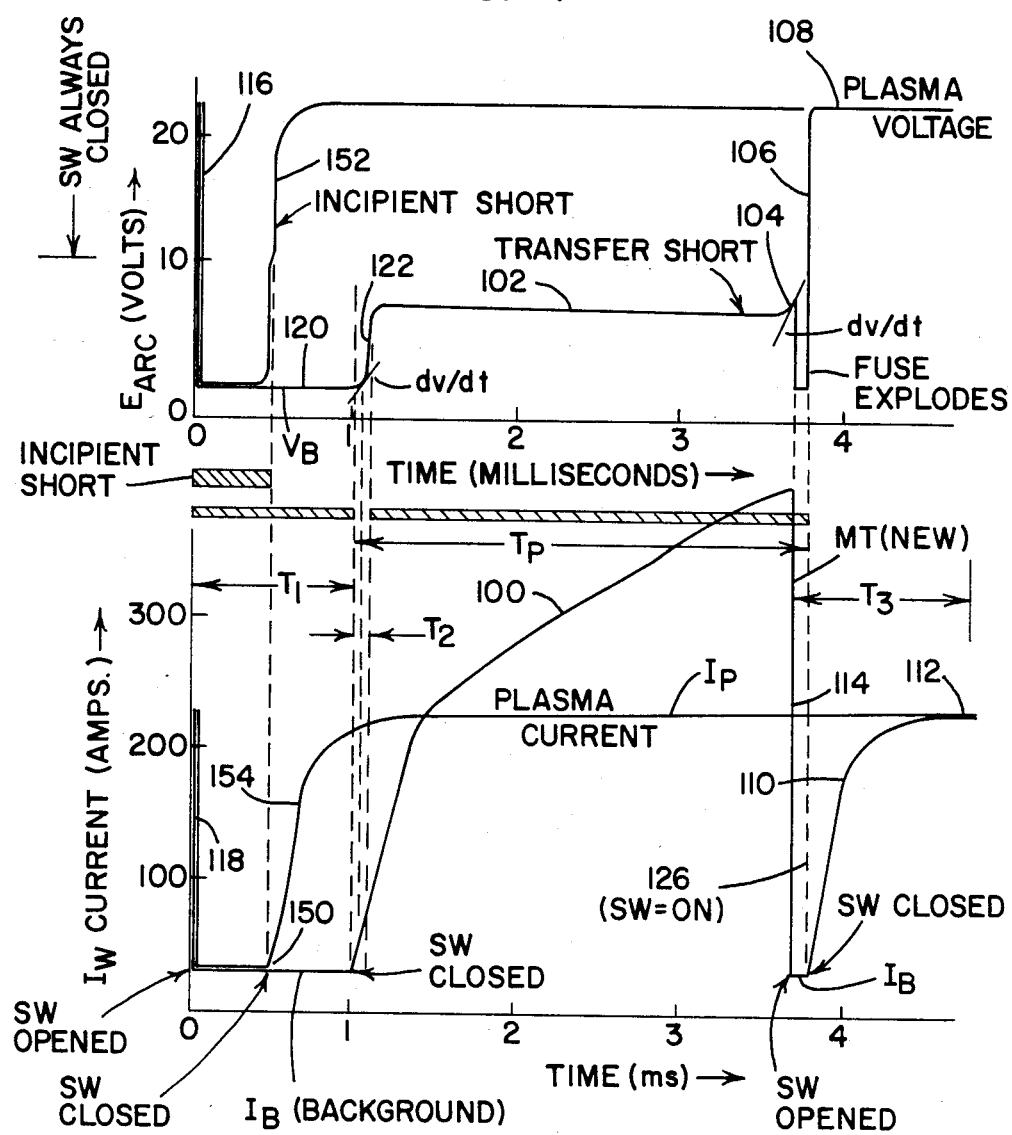
FIG. 4 shows voltage and current graphs detailing operating characteristics of the present invention.

Referring again to FIG. 1 and to FIG. 4, the components added in combination with the standard features of system A to accomplish the preferred embodiment of the invention are illustrated in FIG. 1 where spatter reduction circuit SC includes resistor R connected in parallel with a Darlington power transistor switch SW. This parallel circuit is connected in series with nozzle 20, wire 22 and workpiece 30. To complete the preferred embodiment of the present invention, spatter reduction circuit SC also includes solid state logic control system L for operating switch SW. The manner of operating the switch in relationship to parameters at the welding site substantially eliminates spatter SP experienced in standard short circuit welding. Control L commands Darlington switch SW to be either conductive or non-conductive. When non-conductive, resistor R is in series with the welding operation to create a low level welding current hereinafter referred to as the background current $I_B$. In practice, resistor R is 1.0 Ohms which develops approximately 300 volts across the resistor when switch SW is turned off while the main current flow is near 300 amperes. Consequently, power supply 10 is never actually disconnected or grounded to reduce the current flow through the welding operation irrespective of the status of switch SW. Merely switching between a direct connection through switch SW and current flow through only resistor R causes welding current $I_W$ to either (a) float, in accordance with standard pulse MT or (b) be driven downward by opening switch SW with a logic control L. One aspect of the present invention is the use of a Darlington connected power transistor having a rating of several hundred amperes and several hundred volts. The Darlington connected transistor network SN is preferred because of capabilities of rapid switching under heavy current conditions. This type switch is part of the present invention which must drop the welding current from a high level main current to a low level background current $I_B$ within less than about 120 microseconds when the switch is opened or in the non-conductive condition.

An appropriate voltage sensor, schematically represented as device 60, and a current sensor 62 provide logic control L with instantaneous welding current $I_W$ and arc voltage $E_{ARC}$ so that logic control L opens and closes switch SW to provide the weld current control as illustrated in FIG. 4. The basic aspects of the present invention are set forth in graphic form in the upper graph of FIG. 4, which graph illustrates voltage fluctuations. The lower graph illustrates welding current $I_W$ through the wire and workpiece as correlated on a time base with the upper voltage curve.

FUSE SPATTER REDUCTION

To appreciate one aspect of the present invention to reduce the fuse energy to reduce spatter SP, attention is directed to the right hand end of the metal transfer pulse MT (NEW) in FIG. 4. This pulse has a front curved shape, side or line 100 correlating directly with portion 102 of the arc voltage which will be described in connection with another aspect of the invention used at the left end of pulse MT. As current $I_W$ increases to the right, the slope decreases eventually, which change in current at the right end of line 100 causes a slight increase in the voltage slope at portion 104. This increase in voltage corresponds with the upper, generally flat portion of transfer pulse MT (NEW). As the current approaches a zero slope and when the voltage experiences an increased slope, the neck N is starting to form, as shown in FIG. 2B. At this instance, in accordance with this aspect of the present invention, either by detecting di/dt or dv/dt, switch SW is opened. This immediately shifts the current to the low background current level $I_B$ schematically illustrated as about 50 amperes in FIG. 4. The welding current stays at this low background level only so long as the arc voltage $E_{ARC}$ does not exceed a preselected value, such as 10 volts illustrated in the upper voltage curve. Then the neck breaks, the short circuit is removed and the voltage rises along vertical line 106. When arc voltage $E_{ARC}$ exceeds the selected low level (i.e. in practice 10 volts) as it moves along line 106, switch SW is closed and the welding current $I_W$ moves along a curve 110, which curve is a time constant curve raising to the plasma or arc welding current value $I_P$, as shown at portion 112. This plasma current is illustrated as being substantially over 200 amperes. At the same time, the voltage assumes its steady state condition at portion 108, illustrated as somewhat over 20 volts.

Pulse MT (NEW) causes metal transfer from the welding rod to the workpiece, i.e. the molten weld pool, as did the conventional metal pulse MT. The time $T_P$ in FIG. 4 is the metal transfer portion of the pulse. The first aspect of the present invention, as explained above, occurs at the end of pulse MT (NEW) and involves recognizing when the neck starts to anticipate a fuse blow. Then welding current $I_W$ is shifted to a low level substantially below the plasma level $I_P$ by opening switch SW and again allowing flow of only background current $I_B$ by interposing resistor R, as shown in FIG. 1. A low current, low energy fuse explosion occurs. At the explosion, the metal transfer pulse is concluded, an arc is established and the voltage rises along line 106. This closes switch SW. The main current is permitted to flow and it increases along time constant portion 110 which starts from the low level $I_B$, illustrated to be less than 50 amperes in FIG. 4. The rapid increase in welding current along line 110 toward the plasma level 112 is a time constant curve. By using switch SW, current restoration does not swing upwardly above the normal plasma level $I_P$. Such unwanted current swing would cause control difficulties in restriking the arc since the applied current would be substantially higher than needed for actual plasma ignition and maintenance. In accordance with this first aspect of the present invention, the circuit SC is designated to drop the current to a low level upon recognizing an imminent fuse explosion. Further, the welding current $I_W$ is held to the low background level $I_B$ for a time $T_3$ which, in practice, is 1.0 ms. However, circuit SC has a control parameter so that whenever voltage $V_{ARC}$ exceeds a preselected level, 10 volts in this instance, switch SW is closed. Since the arc voltage rises when neck N breaks, the rise in voltage always occurs prior to the time $T_3$. Consequently, the holding action of circuit SC for the time delay $T_3$ is only a fail-safe feature assuring that current $I_W$ will ultimately be released for movement to plasma level $I_P$ at point or position 112 after being shifted to the background level $I_B$ along generally vertical line 114 just before the neck blows.

The prior art does not teach the concept of recognizing the necking, shifting to a low level background current value and then shifting back to the plasma level itself without drastically exceeding the plasma level $I_P$ upon reestablishing the arc or plasma. Switching to a low level value $I_B$ is accomplished along the vertical line 114, which is rapid enough to assure a reduction in current by a ratio of nearly 6:1. The prior art generally shifts the current along a controlled time constant curve and then releases the current at some selected time thereafter. Precise control of the welding current is accomplished by the present invention by using Darlington switch SW which provides immediate cutoff of $I_W$ current, without a current storage in output inductors or power leads which would result in the return curve exceeding substantially the plasma level 112.

Figure 5:
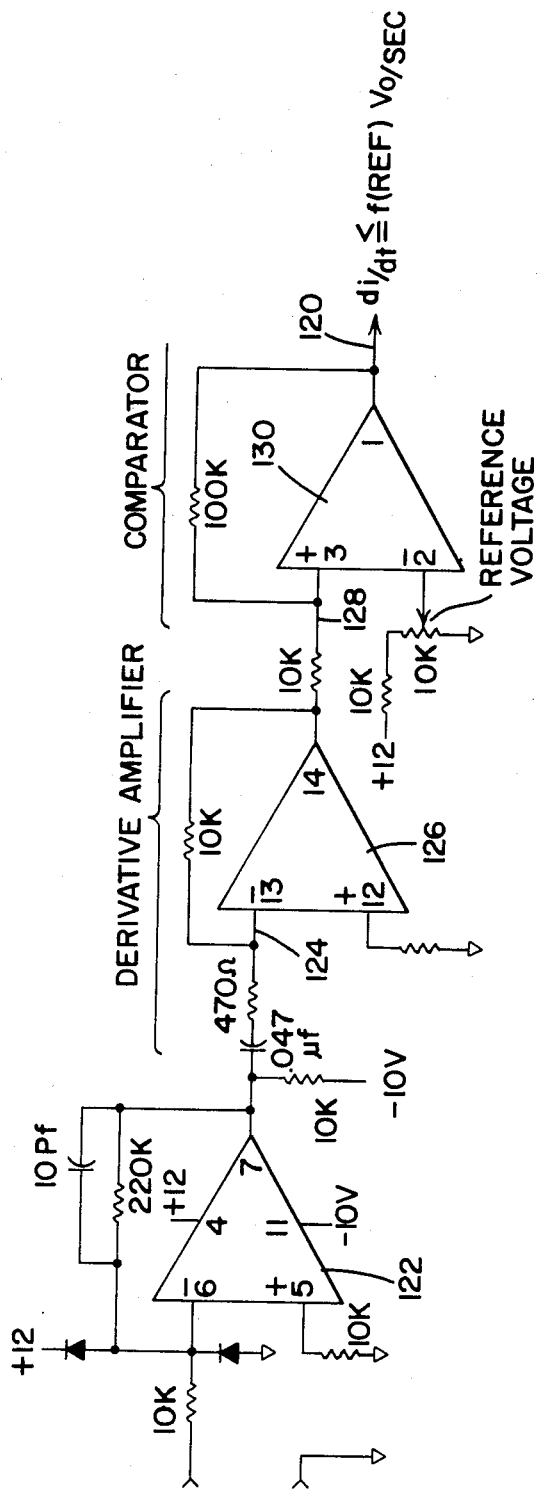
FIG. 5 is a wiring diagram of an alternate system for predicing the occurrence of the fuse action or neck explosion as illustrated in FIG. 2C.

Referring now to FIG. 5, one circuit for detecting top 52 of a metal transfer pulse is illustrated as a di/dt detector, whereby as the current shifts from a positive slope to a zero slope, an appropriate output from line 120 is processed by logic control L and is used to open switch SW. This circuit takes the first derivative of the welding current $I_W$ by differentiator 122. The derivative in line 124 is amplified by amplifier 126 and directed to input 128 of comparator 130. The output provides a logic signal indicating when K di/dt is at a preselected level. Other arrangements could be provided for detecting the top 52 of pulse MT. The time between this top 52 and fuse break point 54 is indicated by the spacing $T_N$. As can be seen, by the scale of the graph in FIG. 3, the time $T_N$ is quite small. Consequently, as soon as a detect signal is generated in line 120, switch SW is immediately opened. This plunges current $I_W$ down to the background current level $I_B$ along line 114. Current $I_B$ is substantially lower than the plasma current $I_P$, as indicated in FIG. 4.

INCIPIENT SHORT SPATTER REDUCTION

In accordance with another aspect of the present invention, spatter control SC is provided with a feature that reduces spatter caused by the phenomenon of incipient shorts. In accordance with this feature, as shown graphically in FIG. 4 the arc or plasma current $I_P$ is immediately dropped to less than 50 amperes (i.e. the background level $I_B$) when any type of short occurs. The voltage drops rapidly along line 116, current $I_W$ drops along line 118 by logic control L opening switch SW. The welding current $I_W$ is shifted to the background current $I_B$ when the short first occurs. Background current $I_B$ is controlled primarily by the value of resistor R and is held for a preselected time or cycle $T_1$ at $I_B$. After this cycle or time $T_1$ expires, switch SW is closed and the voltage at low level 120 commences to rise to steady state level 102, as previously discussed. This drop of current as soon as a short is detected and holding the low level for a selected time eliminates incipient spatter.

To appreciate how the spatter control reduces spatter from incipient shorts certain technical features of the "incipient short" phenomenon are diagrammed in FIGS. 6A, 6B, 6C, 6D, 7 and 8. Referring now to FIG. 6A, when ball B is formed on the end wire 22, the ball, in some instances, does not immediately attach to the molten weld pool by surface tension. The ball may just touch the weld pool as illustrated in FIG. 2B. This is explained by recognizing that the weld pool is molten metal subjected to high arc currents as well as gravity and magnetomotive forces. It resembles a wavy body of water. In many instances, the weld pool engages the ball B, as shown in FIG. 6B, for a short time by a molten metal front striking ball B. The electrical and mechanical forces caused by wave fronts in the weld pool engaging ball B sometimes drives the ball away from the undulating weld pool. This is shown in FIG. 6C. Consequently, there is a short when ball B touches the weld pool WP. This short can be immediately opened by mechanical forces, as shown in FIG. 6C. As this process continues and ball B is not captured by the weld pool, the ball continues to grow by the continuing melting action at the end of wire 22. Ultimately, ball B can be driven away from the weld pool as a substantial mass of molten metal. This is a form of spatter. Due to the mass of the metal in the ball, the mechanical spatter caused by these incipient shorts results in lumps of metal randomly deposited immediately adjacent the weld area. These spatter particles present substantial problems in cleaning and cause waste of weld material and welding energy. FIG. 7 illustrates the current and voltage fluctuation during an incipient short when ball B touches weld pool WP as shown in FIG. 6B. As the ball touches but does not transfer, it swings away as illustrated in FIG. 6C. The current through ball B increases as the ball touches the weld pool. This increased current causes forces as the arc is reestablished, in FIG. 6C, tending to drive ball B away from the weld pool. An incipient short causes the arc voltage to shift downwardly as the current increases between the weld pool and the touching ball. This is shown in the lower curve of FIG. 7. As soon as there is a break caused by mechanical forces between the ball and the weld pool, the voltage moves vertically upwardly along line 130 to the plasma arc voltage level. Since there is no large area contact for surface tension to draw molten ball B into the weld pool in an incipient short condition, the incipient short causes ball B to grow and causes high mechanical forces to exert momentum to the ball B tending to throw the ball away from the weld pool. The incipient short phenomenon is schematically illustrated in FIG. 8 wherein the weld current $I_W$ experiences a series of incipient shorts before an active transfer short. In many instances, the molten ball remains molten after one or more incipient shorts and then goes into a standard transfer without causing large particle spatter. However, often this does not occur. The incipient shorts cause ball B to grow and be propelled outwardly by the high mechanical forces during the short circuit condition. If the effect of incipient shorts, illustrated as small pulses 140, 142, in FIG. 8, is ignored, large particle spatter will occur. This type of weld spatter presents more cleaning problems than spatter caused by breakage of fuse F in FIG. 2C. By using the present invention to drop the welding current to the background level $I_B$ as soon as a short is detected by a decreased voltage level, incipients shorts as shown schematically in FIGS. 6A, 6B, 6C, 6D, 7 and 8 do not occur. The low level current $I_B$ permits the metal contact area to increase and thus develop into a transfer short. There is no high current to force an incipient short.

The "incipient short" graph portion of FIG. 4 illustrates what happens should an incipient short occur as the result of some transient mechanical agitation, during time $T_1$ when the low level current $I_B$ is applied. Referring again to FIG. 4, the cycle or time $T_1$ is 1.0 ms, which time is substantially greater than incipient short duration determined by the width of pulses 140, 142 of the prior art as shown in FIG. 8. Assuming an incipient short occurs in use of the present invention, as soon as the short occurs, as shown in FIG. 6B, the overriding control recognizes the reduction of the arc voltage to a value below the preselected. trip value. Thus, the weld current is shifted downwardly by opening switch SW. In accordance with the present invention, the current flowing during any short is reduced thus reducing mechanical forces known to cause an incipient short condition. The current $I_B$ is drastically below the main current level, thus facilitating large area contact and transfer of the ball to the weld pool.

At point 150, shown in FIG. 4, should mechanical agitation move ball B away from the weld pool, as shown in FIG. 6C, the arc will be reestablished at current level $I_B$. This minimizes the energy evolved when this small fuse explodes to reduce associated spatter at this small fuse action. The arc voltage rapidly shifts upward along curve 152. As soon as the arc voltage exceeded the preselected value, which is an override, trip condition valid at all times in control SC, switch SW would be closed. The weld current $I_W$ would then rise from the background current level $I_B$ to the plasma current level $I_P$.

Power supply 10 is a constant voltage machine set at a plasma voltage of approximately 20-30 voltage and it feeds a short in the general range of 1-6 volts. When using this type machine, applying a main current by closing switch SW allows the welding current to reach the normal unimpeded current level schematically illustrated as the increasing line 100 in FIG. 4. When switch SW is opened, resistor R controls the welding current at the low, background level $I_B$. As a recapitulation in the present invention, the main current is the normal unimpeded current and the background current is the current controlled by the resistor.

GENERAL DESCRIPTION

Referring now to FIGS. 9 and 10, an advantage of employing the present invention is illustrated. In accordance with the invention, during the metal transfer, the current when switch SW is closed, rises, as shown by pulse MT (NEW), from a low level background current $I_B$ to a detected top portion 52a, at which time switch SW is opened and the current plunges along portion 180. This action is affected by the time constant including inductive reactance $X_L$ of choke 190 which is usually inside power supply 10. This inductance is also created by the length of conductors 12, 14 extending from the power supply to nozzle 20 and workpiece 30. The time to plunge from top 52a to the background current $I_B$, represented in the disclosed formula as $I_O$, is relatively short. Thus, the current at the time of the fuse break will depend upon the lead time of switch turn off before the fuse break. Lead times have been selected to cause the fuse break at approximately 10% of the height at the top 52a when it is 200 amperes. This current reduction after reaching top 52a, combined with the initial drop from plasma current $I_P$ to background current $I_B$, results in a substantial reduction in the separation energy when fuse F explodes or blows in response to further current flow through welding wire 22. Reduction of energy is thus accomplished by two phenomena. One is starting the transfer pulse at a low background level, i.e. in practice less than 50 amperes. The second is using a Darlington transistor switch to immediately open the switch and drive current to a level controlled by resistor R.

A power supply or welding system employing the present invention has three distinct stages determining the welding current. At first, the current is the plasma level during the arcing condition. Secondly, the current is depressed to a background level in response to a short circuit. Thirdly, at the end of a short circuit formed by metal transfer, the current is again depressed. During the transfer of metal, the current is controlled by the electrical parameters of the circuit. A schematic illustration of these various welding current stages during a standard metal transfer pulse is found in FIG. 11. This view corresponds generally to the pulse MT (NEW) in the lower portion of FIG. 4. In spatter reduction control circuit SC, whenever the arc voltage exceeds the preselected value, in this case, 10 volts, switch SW is closed to direct main current through the switch to the welding operation. The main switch is closed during the pulse MT (NEW); however, background voltage $V_B$ in portion 120 of FIG. 4 shifts upwardly to the generally horizontal portion 102.

DETECT INHIBITOR AND TIME DELAY

Figure 11:
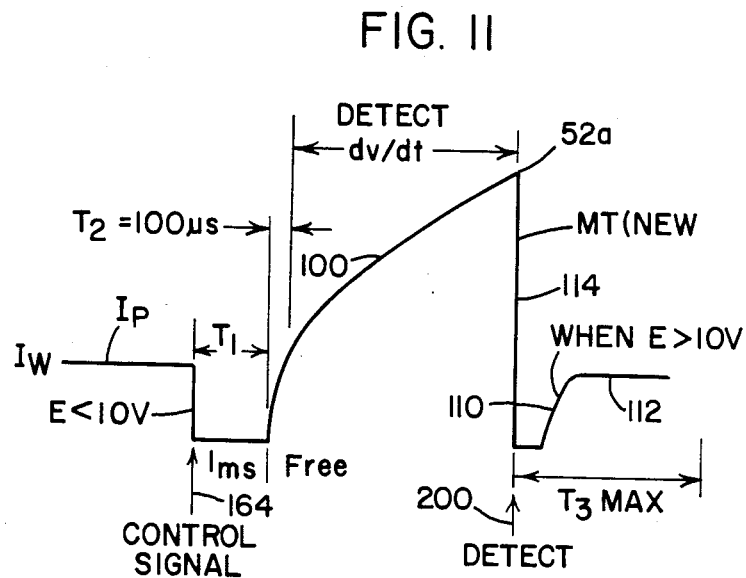
FIG. 11 is a wave shape graph showing a metal transfer pulse employing all aspects of the present invention.

FIG. 11 illustrates a time delay $T_2$ which is, in practice, 100 microseconds and occurs immediately after cycle $T_1$. When this delay cycle is employed in the preferred embodiment of the present invention, it inhibits the circuit used to detect when the fuse is about to blow which is at a position near top 52a of curve 100. Such a circuit is illustrated in FIG. 5 to detect the change in sign of di/dt. FIG. 13 discloses a circuit which measures and detects a preselected slope or derivative of the arc voltage, i.e. dv/dt. These detector circuits are inhibited until time delay $T_2$ expires. The reason for this feature is appreciated when considering portion 122 of the arc voltage immediately upon closing switch SW as shown in FIG. 4. The current causes a voltage rise that, in turn, produces a value of dv/dt which would erroneously trigger a dv/dt circuit because of the increase in current. This would open switch SW erroneously. For that reason, a slight delay $T_2$ is provided after expiration of cycle $T_1$ and closing of switch SW.

At the time of the transfer fuse and the drop of current along line 114 before the fuse explodes, time $T_3$ is set. Time delay $T_3$ follows the detection signal 200 caused by a detection of the point on curve 100 just before fuse explosion or blow and has a maximum value. Time delay $T_3$ is shown in FIG. 11; however, it is seldom, if ever used. When switch SW is opened in response to a detect signal 200, the fuse blows with low current flow. An arc condition then forces the voltage along line 106 of FIG. 4 to above the 10 volt limit, an action that closes switch SW and causes the current to rise along line 110 to portion 112, which is the plasma current level. Immediate increase in voltage by interrupting the short reconditions the system of the present invention to seek the next metal transfer cycle and to repeat control at the forward and rear ends of the welding current pulse. In the intermediate portion a floating condition exists along lines 100, 102, as explained in connection with FIG. 4. Should the arc not cause a voltage override to close the switch, the switch will be closed after time $T_3$.

CURRENT CONTROL

Figure 12:
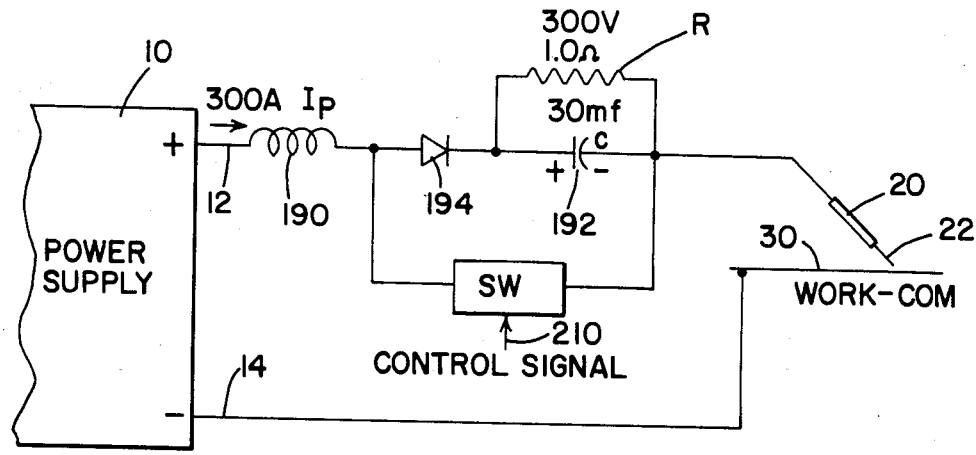
FIG. 12 illustrates the preferred embodiment of the present invention with components for protecting the power Darlington transistor from high voltage and high circulating current.

Control of the background current occurs when a control signal 210 opens switch SW as illustrated schematically in FIG. 12. That event places resistor R (1.0 Ohms) directly into the welding circuit and removes current flow through switch SW. For the purpose of explaining certain aspects of the invention, it is assumed that the plasma current $I_p$, as shown in FIG. 4, is approximately 300 amperes. When the switch is opened in response to the plunge in the arc voltage by a short condition, the 300 ampere current flowing when the switch is closed, develops 300 volts across resistor R. This high voltage is applied directly across Darlington transistor switch SW. To reduce the voltage across switch SW during turn off, capacitor 192, having a value of 30 mf, is connected in parallel with the resistor R. Consequently, resistor R immediately charges capacitor 192 toward the 300 volts of the resistor. In this example, it would require about 30 microseconds for capacitor 192 to charge to 300 volts. The actual fall time of the Darlington collector current is less than 5 microseconds; therefore, charging of capacitor 192 protects Darlington transistor against excessive power switching dissapation. A snubber or diode 194 prevents discharge of capacitor 192 through the switch SW, should the switch close when capacitor 192 is fully charged. Resistor R has at least two distinct functions in accordance with the present invention. The resistor establishes the magnitude of the background current $I_B$. If the voltage from power supply 10 is 20 volts D.C. as shown in FIG. 4, background current is 20 amperes calculated by dividing 20 volts by 1.0 Ohm. As a second function, resistor R protects the Darlington transistor switch SW against over voltage. A basic advantage of resistor R is that with resistor R in parallel with the Darlington switch SW there is no need for a second source of current to produce the background current. Further, there is no need for complicated circuitry attempting to control current based on sensed conditions or parameters. Merely placing resistor R is parallel with Darlington switch SW produces the main current, when the switch is closed, and the background current $I_B$ when the switch is opened. This is the unique concept for providing current levels which are employed in a unique system conveniently controlling spatter both of the electrical type caused by blowing of fuse F and the mechanical type caused by the incipient short phenomenon. With capacitor 192 connected in parallel with resistor R, stored energy from the inductor 190 is dissipated when the switch is first opened and non-conductive. This dissipation of energy occurs rapidly and is accomplished before the switch SW is conductive or turned on as indicated by the dashed line 126 in FIG. 4. Since the energy has been dissipated, curve 110 can be gradually merged into the plasma current level along a curve determined by the time constant of inductance or choke 190. Without the resistor and its capacitor for dissipating stored energy in the inductance, there would be no background current and thus no ionization formed by low current fuse action and, thus, cause an unstable arc start up or restrike.

PREFERRED CIRCUIT

Figure 13A:
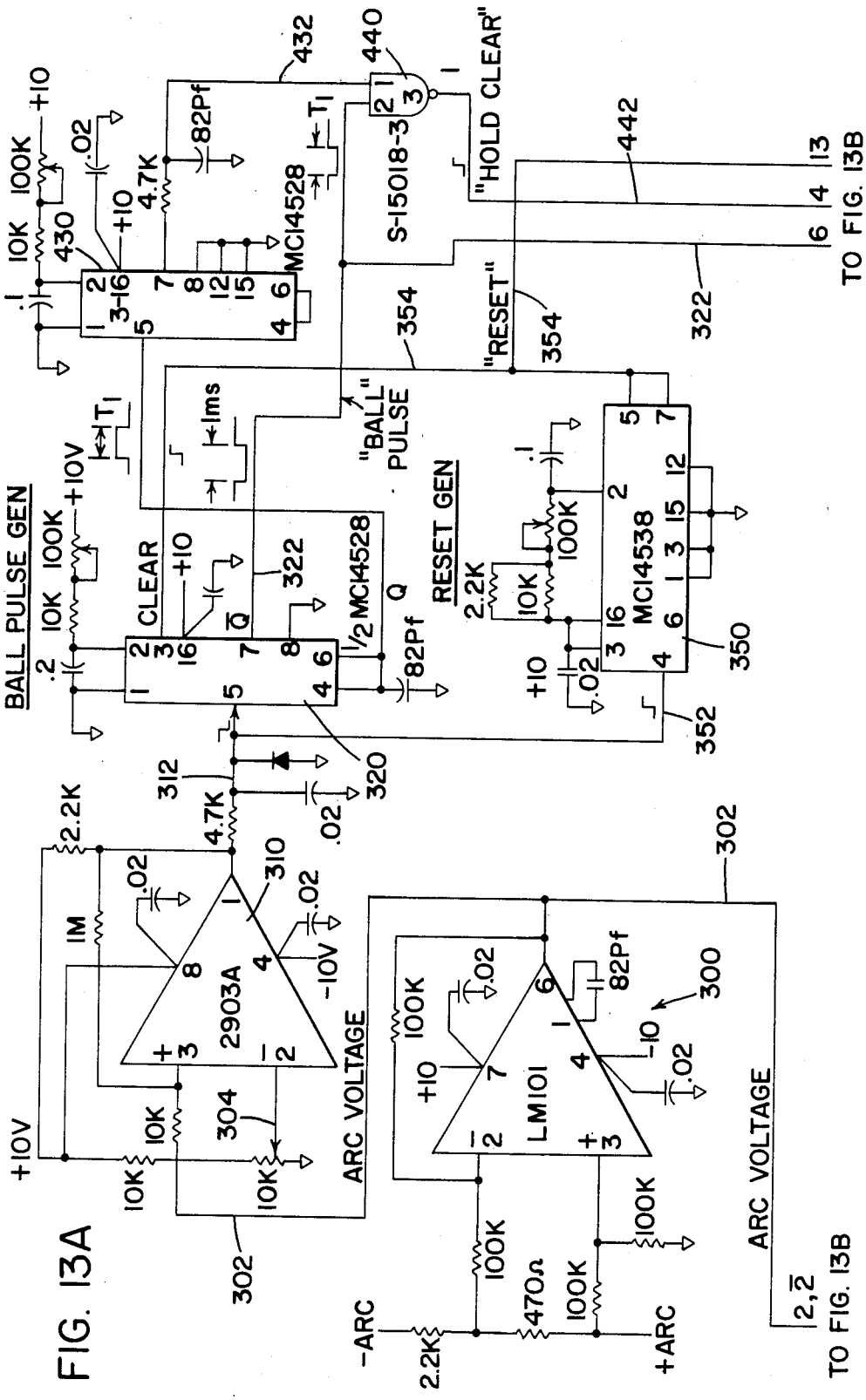
FIG. 13 is a wiring diagram of the actual circuit employed in practicing the preferred embodiment of the present invention which diagram is divided into two sheets labeled FIGS. 13A and 13B, and, FIG. 14 is a schematic diagram of the welding current, arc voltage for each state of the welding operation and contrasting a standard short circuit welding system with a system using the new spatter control system.

FIGS. 13A and 13B, taken together, describe the preferred circuit for practicing the invention, as best shown in FIGS. 4 and 11. Each of the components is labeled; therefore, the circuitry is somewhat self-explanatory and only a brief description of the operation of the circuit is sufficient to understand how the circuit complies with the parameters of the present invention. The arc voltage passes through a noise reduction circuit 300 having an output 302 labeled ARC VOLTAGE. A reference voltage in line 304 is combined with output 302 by comparator 310 to produce a logic level in output 312. The logic in this line controls a monostable multivibrator or ball pulse generator 320 which is triggered when the logic in line 312 shifts to zero indicating that the ARC VOLTAGE has descreased below the reference set in line 304. When this occurs, a 1.0 ms negative pulse appears in the $\bar{Q}$ output 322 for controlling NAND gate 330. A logic 0 in line 322 forces the output 332 of NAND gate 330 to be at a logic 1. This opens switch SW by an appropriate circuit 340. The control of line 322 corresponds generally with control signal line 210 of FIG. 12. In this manner, the switch SW is turned off for 1.0 ms corresponding to cycle $T_1$. Should the voltage increase above the preselected value determined by reference line 304, reset generator 350 having an input 352 connected with line 312 shifts output line 354 to a logic 0, thus, clearing ball pulse generator 320 and terminating the $T_1$ time pulse. A logic 1 is applied to the input line 322 of gate 330. At the same time, the reset logic in line 354 resets fuse time generator 360, if it is not already reset or cleared. A logic 1 is thus applied, as a pulse, to line 362. This logic combines with logic 1, on input 322 to produce a logic 0 in line 332. This turns the Darlington transistor switch SW on whenever arc voltage exceeds the preselected value set, in the preferred embodiment, at 10 volts. This voltage is selected to be greater than the voltage drop across wire 22 to assure enough available voltage drop for proper detection.

As previously discussed with respect to FIG. 5, fuse F can be predicted when necking occurs as detected by dv/dt. In FIG. 13, including both FIGS. 13A and 13B, a derivative of the arc voltage is compared to a constant K for the purpose of predicting the fuse immediately upon establishment of neck N. This is illustrated schematically in the upper portion of FIG. 4 at portion 104. To accomplish this comparison of dv/dt with K, the preferred circuit in FIG. 13 uses a sample and hold concept. A sample oscillator 380 produces a series of sample pulses in output 382. This is applied to the sample and hold circuit 390 to sample the voltage at precisely spaced instances as the voltage is received on line 302. The output of sample and hold circuit 390 is line 392 which compares a held sample voltage with an instantaneous voltage in line 302. These two time spaced voltages (i.e. $V_N$ and $V_{n-1}$) are compared by comparator 400 to produce a differential in voltage as compared to time. This differential signal is amplified by amplifier 410 to create a differential of voltage with respect to time in line 412. The constant or K is selected by pot 414 which directs a selected constant through line 416 at the input of flip-flow 420 through line 418. When the dv/dt exceeds slope K, flip-flop 420 is clocked. This applies a logic 1 in line 422 producing a logic 0 in line 362 turning off circuit 340 by a logic 1 in line 332. As so far described, when the voltage is less than 10 volts, switch SW is open for a time $T_1$ which may be overridden by a voltage increasing above 10 volts, such as would occur in an incipient short. This will cause interruption of cycle $T_1$, as indicated by line 152 in FIG. 4. With the switch SW closed during a short circuit, flip-flop 420 is awaiting a signal in line 418 indicating that dv/dt has exceeded constant K. When that occurs, a 1.0 ms pulse occurs in line 362 holding line 332 at a logic 1. This is the time or cycle $T_3$, shown in FIG. 4, which cycle is generally never reached and is only a feature providing back-up assurance that the system will shift to the plasma current after a short. Before that happens, arc voltage increases along line 106 to a level above a preselected value of 10 volts. This causes reset generator 350 to reset ball pulse generator 320 placing a logic 1 in line 322. At the same time, reset pulse in line 354 produces a logic 1 in line 362. These two logic 1 inputs to gate 330 produces a logic 0 in line 332, which turns on switch SW.

The inhibit feature indicated by time $T_2$ as shown in FIG. 4 assures that the derivative flip-flop 420 does not operate until 100 microseconds after $T_1$ is concluded. This is accomplished by another monostable multivibrator 430 having an output 432 which is combined logically with the logic in ball pulse line 322 by NAND gate 440. The output 442 is labled HOLD CLEAR. It remains at a logic 1 until cycle $T_1$ expires as indicated by the logic in line 322. Thereafter the 100 microsecond negative pulse on line 432 expires. This pulse is shown at the bottom of FIG. 13B. As long as a logic 1 is maintained in line 442, flip-flop 420 can not toggle to place a logic 1 in line 422. Consequently, time $T_2$ at the end of cycle $T_1$ maintains the differential circuit inactive for a short time allowing the voltage and current to stabilize and operate in a floating condition awaiting an ultimate detection at or near the top 52a of metal transfer pulse MT (NEW).

FIG. 14

Figure 14:
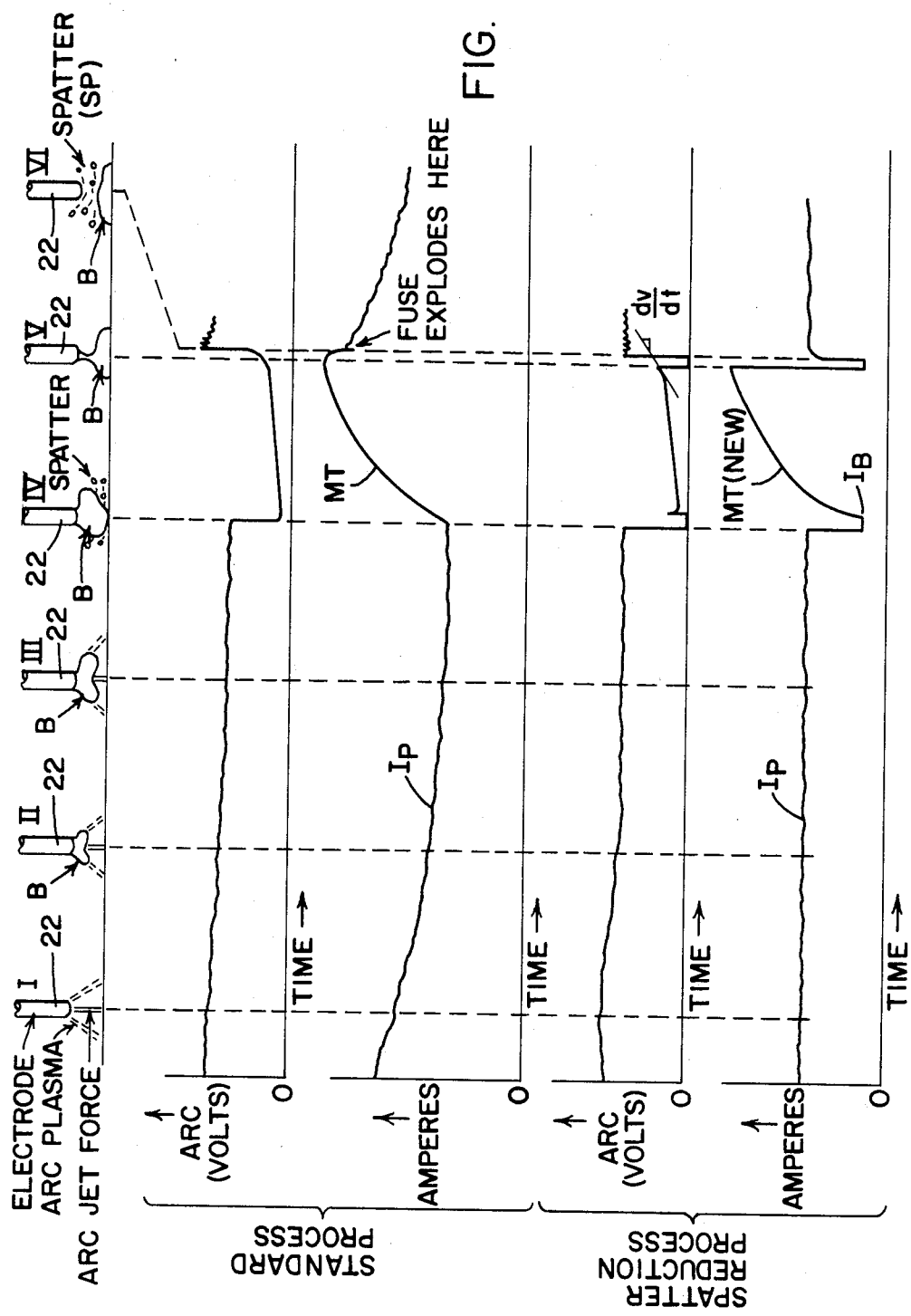

Referring now to FIG. 14, the top graph depicts stages of a standard short circuiting welding operation with arc jet forces and plasma created at the first stage I. The ball starts to grow in stages II and III. Then an incipient short occurs with spatter at stage IV. After the incipient short has been terminated and a transfer is started, the ball starts to neck at stage V. Then the fuse blows at stage VI. Current and voltage curves for these stages are illustrated for a system without a spatter reduction device of the present invention and labeled "Standard Process". The corresponding process curves using the present invention are set forth at the lower portion of FIG. 14. As can be seen the present invention maintains a controlled plasma current as well as controlling the transfer pulse to nearly eliminate weld spatter.

In accordance with the present invention, there is a voltage responsive override whereby the main current is applied by closing switch SW whenever the voltage exceeded a preselected value, in the illustrated embodiment 10 volts. This override voltage is generally selected as about half of the arc or plasma voltage.

Having thus defined the invention, the following is claimed:

1. A device for reducing spatter when a welding power supply is employed for depositing metal from a welding wire onto a workpiece by the short circuiting transfer mode wherein a welding current causes the welding wire to alternate between a short circuit condition and an arc condition, with metal transfer during a short circuit condition requiring a transfer time $T_P$ during which transfer time the welding current rises and then falls as a melted portion of said wire is transferred to said workpiece, said device comprising:
(a) means for sensing a control voltage indicative of the voltage between the welding wire and the workpiece;
(b) comparator means for creating a short signal when said control voltage decreases to a value less than a preselected voltage indicative of a short circuit condition and an arc signal when said control voltage increases to a value greater than said preselected voltage;
(c) switching means having a first switched conductive condition wherein said welding current is a high current allowed to reach the normal unimpeded current level controlled by said power supply and a second switched non-conductive condition wherein said welding current is forced to flow through a low resistance resistor to limit the welding current to a low level background current, said switching means having low stored energy when shifted into either of said conditions;
(d) first shift means responsive to said short signal for shifting said switch means into said second switched condition to start said short circuit condition with said background current and second shift means for shifting said switch means into said first condition whenever said control voltage exceeds said preselected voltage;
(e) means responsive to said first shift means for holding said switch means in said second, low current condition for a cycle $T_1$ at the start of said short circuit condition, wherein cycle $T_1$ has a duration with a maximum time substantially less than said transfer time $T_P$; and,
(f) means separate from said second shift means operable during said short circuit codition for shifting said switch means to said first condition for the remainder of a short circuit condition whereby said welding current is allowed to reach the normal unimpeded current level in an unrestricted manner unless said arc condition is established during a short circuit condition.

2. A device as defined in claim 1 wherein said switching means includes a solid state switch connected in series with said wire and workpiece.

3. A device as defined in claim 2 wherein said switching means is a Darlington type power transistor.

4. A device as defined in claim 1 wherein said power supply includes an output choke and said switching means being located between said choke and said welding wire.

5. A device as defined in claim 1 wherein said transfer time $T_p$ is in the general range of 2-5 ms and said maximum time of cycle $T_1$ is substantially less than 2 ms.

6. A device as defined in claim 5 wherein said maximum time of cycle $T_1$ is approximately 1.0 ms.

7. A device as defined in claim 1 wherein said maximum time of cycle $T_1$ is approximately 1.0 ms.

8. A device as defined in claim 1 including means for detecting a preselected electrical parameter occurring just before an abrupt change from the short condition with the wire metal touching the workpiece to the arc condition during metal transfer time $T_p$ after cycle $T_1$ and means for shifting said switch means to said second switch condition upon detecting said parameter.

9. A device as defined in claim 8 wherein said electrical parameter is the difference between the time base slope of an electrical characteristic and a reference value.

10. A device as defined in claim 9 wherein said time base slope is dv/dt of the voltage causing said welding current.

11. A device as defined in claim 8 wherein detecting means includes means for measuring and storing an electrical characteristic, means for comparing the difference between the value of said stored characteristic and a present time value of said characteristic with a reference value to detect said parameter.

12. A device as defined in claim 8 including means for inhibiting said detecting means during a time $T_2$ immediately after cycle $T_1$.

13. A device as defined in claim 2 wherein time $T_2$ is at least about 50-100 microseconds.

14. A method for reducing spatter when a welding power supply is employed for depositing metal from a welding wire onto a workpiece by a short circuiting transfer mode wherein a welding current causes the welding wire to alternate between a short circuit condition and an arc condition, with metal transfer during a short circuit condition requiring a transfer time $T_P$ during which transfer time the welding current rises to a maximum value and then falls, said method comprising the following steps:
(a) shifting said welding current to a background current value in response to a voltage drop between said wire and said workpiece indicative of a short condition;
(b) holding said welding current generally at said background current value for a preselected time;
(c) then allowing said welding current to reach the normal unimpeded current level;
(d) causing said holding step to be terminated before said preselected time in response to an arc condition;
(e) sensing the slope of the welding current or welding voltage during the transfer time $T_P$;
(f) shifting said welding current to said background current generally when said welding current reaches a level at or just beyond said maximum value as determined by said sensing step;
(g) again holding said welding current generally at said background current value for a preselected time; and,
(h) again causing said second holding step to be terminated before said preselected time in response to an arc condition.

15. The method as defined in claim 14 wherein the ratio of said background current value to said maximum value of said current during said transfer time is at least as low as about 1:3.

16. The method as defined in claim 14 further including the steps of:
(i) inhibiting said slope sensing step for a very short time after said first holding step; and,
(j) then allowing said welding current to reach the current level as defined in step (c).

17. The method as defined in claim 16 wherein said very short time is less than about 100 microseconds.

18. The method as defined in claim 17 wherein said preselected time is less than 2 ms.

19. The method as defined in claim 18 wherein said transfer time is greater than 2 ms.

20. The method as defined in claim 16 wherein said preselected time is less than 2 ms.

21. A method of reducing spatter when a welding power supply is employed for depositing metal from a welding wire onto a workpiece by a short circuiting transfer mode wherein a welding current causes the welding wire to alternate between a short circuit condition and an arc condition, with metal transfer during a short circuit condition requiring a transfer time $T_P$ during which transfer time the welding current rises and then falls, said method comprising the steps of:
 (a) sensing a control voltage indicative of the voltage between the welding wire and the workpiece;
 (b) creating a short signal when said control voltage decreases to a value less than a preselected voltage indicative of a short circuit condition and an arc signal when said control voltage increases to a value greater than said preselected voltage;
 (c) detecting a preselected electrical characteristic parameter occurring just before an abrupt change from the short condition with the wire metal touching the workpiece to the arc condition during metal transfer time $T_P$;
 (d) shifting said welding current immediately to a background low level upon detecting of said preselected electrical characteristic;
 (e) holding said welding current generally at said background current value for a preselected time;
 (f) then allowing said welding current to reach the normal unimpeded current level by closing a switch; and,
 (g) causing said holding step to be terminated before said preselected time in response to an arc condition upon creation of an arc signal.

22. The method as defined in claim 21 wherein said parameter is the slope of the voltage curve during a selected portion of said transfer time.

23. A device for reducing spatter when a welding power supply is employed for depositing metal from a welding wire onto a workpiece by a short circuiting transfer mode wherein a welding current causes the welding wire to alternate between a short circuit condition and an arc condition, with metal transfer during a short circuit condition requiring a transfer time $T_P$ during which transfer time the welding current rises and then falls, said device comprising:
 (a) means for sensing a control voltage indicative of the voltage between the welding wire and the workpiece;
 (b) comparator means for creating a short signal when said control voltage decreases to a value less than a preselected voltage indicative of a short circuit condition and an arc signal when said control voltage increases to a value greater than said preselected voltage;
 (c) switching means having a first switched conductive condition wherein said welding current is a main current allowed to reach the normal unimpeded current level, said first condition existing whenever said control voltage is greater than said preselected voltage and a second switched non-conductive condition wherein said welding current is a low level background current;
 (d) means for detecting a preselected electrical characteristic parameter occurring just before an abrupt change from the short condition with the wire metal touching the workpiece to the arc condition during metal transfer time $T_P$ and means for shifting said switch means to said second condition upon detecting said parameter; and,
 (e) said switching means being a solid state switch in series with said wire and workpiece and a shunt resistor in parallel with said solid state switch to define said background current when said switch is non-conductive; and, a capacitor in parallel with said resistor and a snubber diode in said parallel circuit and in series with said parallel resistor and capacitor.

24. A device for reducing spatter when a welding power supply is employed for depositing metal from a welding wire onto a workpiece by the short circuiting transfer mode wherein a welding current causes the welding wire to alternate between a short circuit condition and an arc condition with the welding current being at a plasma sustaining level and with metal transfer during a short circuit condition and a subsequent arc condition requiring a transfer time during which the welding current rises and then falls, said device comprising:
 (a) first shifting means for shifting said welding current from said plasma level to a low level background value when a short condition first occurs;
 (b) means for holding said welding current at said background value for a preselected time;
 (c) means for then allowing said welding current to rise from said low level during said short circuit condition for transferring metal to said workpiece;
 (d) means for sensing when said transferring metal starts necking down preparatory to a fuse break;
 (e) means for again shifting said welding current to said low level background value;
 (f) second shifting means for shifting said welding current back to said plasma level awaiting the next successive short condition;
 (g) means for sensing the arc voltage; and,
 (h) said first shifting means being responsive to said arc voltage being less than a selected value and second shifting means being responsive to said arc voltage being greater than a selected value.

25. The device as defined in claim 24 wherein said two selected voltage values are substantially equal.

26. A device as defined in claim 24 including means for shifting said welding current to said plasma level whenever said arc voltage is less than said first mentioned selected level.

27. A method of reducing spatter when a welding power supply is employed for depositing metal from a welding wire onto a workpiece by the short circuiting transfer mode wherein a welding current causes the welding wire to alternate between a short circuit condition and an arc condition with the welding current being at a plasma sustaining level and with metal transfer during a short circuit condition and a subsequent arc condition requiring a transfer time during which the welding current rises and then falls, said method comprising the following steps:
 (a) shifting said welding current from said plasma level to a low level background value where a short condition first occurs;
 (b) holding said welding current at said background value for a preselected time;
 (c) then allowing said welding current to rise from said low level during said short circuit condition for transferring metal to said workpiece;

(d) sensing when said transferring metal starts necking down preparatory to a fuse break;

(e) shifting said welding current to said low level background value;

(f) shifting said welding current back to said plasma level awaiting the next successive short condition; and, (g) sensing the arc voltage, actuating said first shifting step in response to said arc voltage being less than a selected value and activating said second shifting step in response to said arc voltage being greater than a selected value.

28. A method as defined in claim 27 wherein said sensing step includes the further steps of:

(g) measuring the di/dt of the welding current; and, (h) detecting when the sign of di/dt changes.

29. A method as defined in claim 27 wherein said sensing step includes the further steps of:

(g) detecting the dv/dt of the arc voltage; and, (h) detecting when the slope of dv/dt equals a selected value.

* * * * *

UNITED STATES PATENT AND TRADEMARK OFFICE
CERTIFICATE OF CORRECTION

PATENT NO. : 4,717,807
DATED : January 5, 1988
INVENTOR(S) : John M. Parks; Elliott K. Stava It is certified that error appears in the above-identified patent and that said Letters Patent are hereby corrected as shown below:

Column 5, line 9, "or" should read --- of ---. Column 6, line 47, "abrputly" should read --- abruptly ---. Column 7, line 24, "predicing" should read --- predicting ---; line 67, "desired" should read --- described ---. Column 13, line 7, after "end" insert --- of ---. Column 14, line 1, "incipients" should read --- incipient ---. Column 17, line 66, "flip-flow" should read --- flip-flop ---. Column 18, line 32, "13B" should read --- 13A ---. Column 20, line 19, "claim 2" should read --- claim 12 ---.

Signed and Sealed this

Fifteenth Day of November, 1988

Attest:

DONALD J. QUIGG

Attesting Officer

Commissioner of Patents and Trademarks